(12) United States Patent
Hirai

(10) Patent No.: US 7,501,158 B2
(45) Date of Patent: Mar. 10, 2009

(54) METHOD FOR MANUFACTURING HONEYCOMB STRUCTURE

(75) Inventor: Sadaaki Hirai, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 516 days.

(21) Appl. No.: 10/523,683

(22) PCT Filed: Jul. 18, 2003

(86) PCT No.: PCT/JP03/09182

§ 371 (c)(1),
(2), (4) Date: Feb. 3, 2005

(87) PCT Pub. No.: WO2004/018174

PCT Pub. Date: Mar. 4, 2004

(65) Prior Publication Data

US 2005/0244583 A1    Nov. 3, 2005

(30) Foreign Application Priority Data

Aug. 21, 2002   (JP) ............................. 2002-240853

(51) Int. Cl.
*B05D 3/02* (2006.01)
(52) U.S. Cl. .................... 427/393.6; 427/387
(58) Field of Classification Search ........................ None
See application file for complete search history.

(56) References Cited

U.S. PATENT DOCUMENTS 6,242,072 B1    6/2001    Ueda et al.

FOREIGN PATENT DOCUMENTS

| EP | 1 428 808 A1 | 6/2004 |
|---|---|---|
| EP | 1 486 305 A1 | 12/2004 |
| EP | 1 498 179 A1 | 1/2005 |
| JP | 60-181309 * | 9/1985 |
| JP | A-2000-051710 | 2/2000 |
| JP | A-2001-226173 | 8/2001 |
| JP | A-2003-145523 | 5/2003 |
| WO | WO 03/024893 A1 | 3/2003 |
| WO | WO 03/078121 A1 | 9/2003 |
| WO | WO 03/090929 A1 | 11/2003 |

* cited by examiner

*Primary Examiner*—Erma Cameron
(74) *Attorney, Agent, or Firm*—Oliff & Berridge, PLC

(57) ABSTRACT

A honeycomb formed article comprising a plurality of partition walls is prepared using clay mainly composed of a ceramic material, a partition wall strengthening agent obtained by mixing a partition wall strengthening material with a dispersion medium mainly composed of an amphipathic liquid compound having both hydrophilic and hydrophobic groups is coated to a plurality of partition walls existing in at least one cell opening end portion of the formed article, and thereafter the article is fired. According to this method, while largely improving enhancement of productivity and product cost reduction, a honeycomb structure superior in isostatic strength and resistance to erosion can be stably obtained.

7 Claims, No Drawings

METHOD FOR MANUFACTURING HONEYCOMB STRUCTURE

TECHNICAL FIELD

The present invention relates to a method for manufacturing a honeycomb structure, and a honeycomb structure obtained by the method. In more detail, the present invention relates to a method for manufacturing a honeycomb structure, capable of obtaining a honeycomb structure whose partition wall existing in a cell opening end portion or the like has been strengthened by one firing step.

BACKGROUND ART

In a honeycomb structure broadly used in a catalyst carrier for purifying exhaust gas, a higher purifying performance has been demanded in order to cope with exhaust gas regulations which have been tightened year by year. On the other hand, there has also been a demand for reduction of pressure losses from requirements such as low fuel consumption and high output.

Under these situations, the movement for the improvement of purification performance becomes enhanced more and more by reducing the pressure loss with increasing the open pore area at the cell opening end face of the honeycomb structure, and activating a catalyst at an early stage after starting of engine with reducing thermal capacity of the partition walls by making the thickness of partition walls of a honeycomb structure thinner and thinner.

On the other hand, with development of reduction of the wall of the honeycomb structure, erosion phenomenon has raised a new problem, in which various foreign matters mixed in an exhaust gas collide against the partition wall existing in the cell opening end portion of the honeycomb structure, and the partition wall breaks.

Moreover, to solve the problem, a honeycomb structure has been proposed comprising a partition wall strengthened portion whose strength is raised as compared with another partition wall portion in the partition wall already existing in the opening end portion (Japanese Patent Application Laid-Open No. 2000-51710), and various methods for disposing the partition wall strengthened portions have also been proposed.

As the method for disposing the partition wall strengthened portion, a method has been known in which a substrate of the honeycomb structure mainly composed of a cordierite-forming material is fired, and thereafter a slurry containing the cordierite-forming material dispersed in a dispersion medium is coated to the partition wall existing in the cell opening end portion of the substrate, dried, and fired (the same publication as the above, etc.).

However, in this method, a firing step requiring a long time is necessary in two stages: the firing of the substrate; and the firing for disposing the partition wall strengthened portion, and a large problem remains to be solved with regard to production efficiency, manufacturing cost and the like.

To solve the problem, a method has been suggested in which the slurry containing a partition wall strengthening material dispersed in the dispersion medium is coated to the partition wall existing in the cell opening end portion, thereafter dried, and fired, so that the firing of the substrate and the forming of the partition wall strengthened portion are performed in one firing stage (the same publication as the above).

However, in this method, at present, any concrete study has not been made on the difference of material composition as to the substrate before firing and after firing (see the same publication as the above). Especially, an organic binder or the like added for a purpose of raising the strength of the partition wall is usually present in the substrate before firing, but any consideration has not been taken in a point that the organic binder is mostly a water-soluble compound such as methyl cellulose.

Therefore, a partition wall strengthened portion forming step that has heretofore been performed after the firing is performed using the slurry containing the partition wall strengthening material dispersed in water as such before the firing. Then, the organic binder is dissolved and swollen, the partition wall of the obtained honeycomb structure is deformed, and the structure cannot tolerate practical use because of a drop of isostatic strength and the like in the present situation.

On the other hand, by the use of the slurry containing a partition wall strengthening material such as talc dispersed in a non-water-soluble dispersion medium such as kerosene, the problem of the deformation of the partition wall is solved, but the partition wall strengthening material including talc has bad dispersibility, and easily sediments and aggregates. Therefore, it has been difficult to stably coat a certain amount of the partition wall strengthening material to the partition wall. Therefore, this manufacturing method has had a problem that strength, porosity and the like of the formed partition wall strengthened portion easily become non-uniform, and a honeycomb structure having desired resistance to erosion cannot be stably obtained.

The present invention has been developed in consideration of the above-described problem of the conventional technique, and an object thereof is to provide a manufacturing method capable of largely improving enhancement of productivity and reduction of product costs while stably manufacturing a honeycomb structure having a desired isostatic strength and resistance to erosion.

DISCLOSURE OF THE INVENTION

As a result of intensive studies considering the above-described problems, the present inventor has found that by use of a mixed liquid containing a partition wall strengthening material dispersed in a medium mainly composed of an amphipathic liquid compound having both hydrophilic and hydrophobic groups as a partition wall strengthening agent, dispersibility of the partition wall strengthening material is raised without causing dissolving, swelling or the like of an organic binder, and has completed the present invention.

That is, according to the present invention, there is provided a method for manufacturing a honeycomb structure, comprising the steps of: preparing a honeycomb formed article comprising a plurality of partition walls using clay mainly composed of a ceramic material; coating a partition wall strengthening agent to a plurality of partition walls existing in at least one cell opening end portion of the obtained formed article; and thereafter firing the article, wherein a dispersion liquid containing a partition wall strengthening material mixed in a dispersion medium containing an amphipathic liquid compound having both hydrophilic and hydrophobic groups as a main component (this means "a component which most contributes to dispersibility", and this also applies to the following) is used as the partition wall strengthening agent.

In the present invention, the amphipathic liquid compound is preferably a nonionic amphipathic liquid compound, more preferably modified silicone oil into which a hydrophilic organic group has been introduced.

Moreover, as the modified silicone oil, one of polyether modified silicone oil and hydrophilic special modified silicone oil, or a mixture of them is preferable.

Furthermore, in the present invention, the partition wall strengthening material is preferably a cordierite melting point lowering material comprising one selected from a group consisting of silica, magnesia, talc, and kaolin, or a mixture of two or more of them.

Additionally, in the present invention, in a case where a water-soluble organic binder is contained in the clay in addition to a ceramic material which is a main component, concrete examples of the water-soluble organic binder having a large effect includes at least one type selected from a group consisting of hydroxypropyl methyl cellulose, methyl cellulose, hydroxyethyl cellulose, carboxyl methyl cellulose, polyvinyl alcohol, and polyvinyl acetal.

BEST MODE FOR CARRYING OUT THE INVENTION

An embodiment of the present invention will be concretely described hereinafter.

In a manufacturing method of the present invention, a honeycomb formed article comprising a plurality of partition walls is prepared using clay mainly composed of a ceramic material, and a partition wall strengthening agent containing a partition wall strengthening material mixed in a dispersion medium mainly composed of a amphipathic liquid compound having both hydrophilic and hydrophobic groups is coated to a plurality of partition walls existing in at least one cell opening end portion of the formed article, and thereafter firing.

In the present invention, since the firing of the formed article itself and the forming of the partition wall strengthened portion can be simultaneously performed by one firing operation, enhancement of productivity and reduction of product cost can be largely improved. In addition, the dispersion medium of the partition wall strengthening agent is mainly composed of the amphipathic liquid compound having both the hydrophilic and hydrophobic groups, for example, modified silicone oil in which a hydrophilic organic group has been introduced. Therefore, when the partition wall strengthening agent sticks to the partition wall, the water-soluble organic binder is not dissolved or does not swell. A honeycomb structure having a desired isostatic strength without any partition wall deformation such as cell kink is obtained.

Furthermore, since the partition wall strengthening material, for example, talc or the like is mixed in a dispersion medium mainly composed of the amphipathic liquid compound having both the hydrophilic and hydrophobic groups, dispersibility of the partition wall strengthening material is very high. A certain amount of partition wall strengthening material can be constantly stably coated to each partition wall, and a honeycomb structure having desired resistance to erosion can be stably manufactured. Each step will be concretely described hereinafter.

In the present invention, first the formed article of the honeycomb structure comprising a plurality of partition walls is prepared using the clay mainly composed of the ceramic material.

In the present invention, there is not any special restriction as to the ceramic material, and at least one type selected from a group consisting of silicon carbide, boron carbide, titanium carbide, zirconium carbide, silicon nitride, boron nitride, aluminum nitride, alumina, zirconia, mullite, cordierite-forming material, aluminum titanate, and sialon is usable.

In the present invention, another additive may be contained in the clay as desired, and, for example, a binder, a crystal growing auxiliary agent, a dispersant, a pore former or the like may be contained. The examples of the binder include water-soluble organic binders such as hydroxypropyl methyl cellulose, methyl cellulose, hydroxyethyl cellulose, carboxyl methyl cellulose, polyvinyl alcohol, and polyvinyl acetal. The examples of the crystal growing auxiliary agent include magnesia, silica, yttria, iron oxide and the like, and the examples of the dispersant include ethylene glycol, dextrin, fatty acid soap, polyalcohol and the like. The examples of the pore former include graphite, flour, starch, phenol resin, and polyethylene terephthalate. It is to be noted that one or two or more types of these additives may be mixed and contained in accordance with purposes.

Moreover, in the present invention, as described above, the partition wall strengthening material mixed in the dispersion medium mainly composed of the amphipathic liquid compound having both the hydrophilic and hydrophobic groups is used as the partition wall strengthening agent. Therefore, when the agent is coated to the partition wall, the water-soluble organic binder is not dissolved or does not swell, and partition wall deformation such as cell kink does not occur. Therefore, the present invention is particularly preferably applicable to a manufacturing method in which the water-soluble organic binder is contained in the clay.

Furthermore, the clay may be prepared in a usual method. For example, a predetermined amount of water or the like is mixed in the ceramic material to which an additive such as a water-soluble organic binder is added, another additive is added as required, and thereafter the material is kneaded with a kneader, a pressurizing kneader, a vacuum kneading machine or the like so that the clay can be obtained.

In the present invention, there is not any special restriction as to the method for preparing the honeycomb formed article, but extrusion forming is preferable in that productivity is superior, and the extrusion forming is preferably performed using extrusion forming devices such as a ram type extrusion forming device and a biaxial screw type continuous extrusion forming device.

Moreover, there is not any restriction as to a partition wall thickness, cell density, cell shape and the like of the honeycomb structure. For example, even when the partition wall thickness is set to 0.05 mm or less, a desired honeycomb structure can be obtained without deforming the partition walls.

Next, in the present invention, the partition wall strengthening agent prepared by mixing the partition wall strengthening material with the dispersion medium mainly composed of the amphipathic liquid compound having both the hydrophilic and hydrophobic groups is coated to a plurality of partition walls existing in the cell opening end portion in the obtained formed article of the honeycomb structure in a stage before the firing.

The examples of the partition wall strengthening material in the present invention include: a material which is coated to the formed article to thereby lower a melting point of the formed article constituting material at a firing time; and a material which forms a layer formed of a ceramic on partition wall surfaces to thereby further thicken the partition walls as compared with general portions.

Moreover, the examples of the former partition wall strengthening material include at least one type selected from a group consisting of talc, silica, magnesia, and kaolin which are components for lowering the melting point of cordierite, or a mixture of them whose composition ratio is different from the theoretical composition value cordierite in a case where the formed article is prepared by a cordierite-forming material. The examples of the latter partition wall strengthening material include a material having the same composition as that of the ceramic material constituting the formed article.

On the other hand, the examples of the dispersion medium mainly composed of the amphipathic liquid compound having both the hydrophilic and hydrophobic groups in the present invention include a dispersion medium mainly composed of a nonionic amphipathic liquid compound, an anionic amphipathic liquid compound, a cationic amphipathic liquid compound, or an ampho-ionic amphipathic liquid compound depending on the type of the hydrophilic group.

Above all, the dispersion medium mainly composed of the nonionic amphipathic liquid compound is preferable in that the dispersibility of the partition wall strengthening material is superior, and the influence of the dissolving or the swelling of the water-soluble organic binder is small. The nonionic amphipathic liquid compound includes all amphipathic liquid compounds whose hydrophilic groups are nonionic. Above all, modified silicone oil is preferable in which the hydrophilic organic group has been introduced (all introduction modes such as replacement and addition are included) from viewpoints of dispersibility of the above-described partition wall strengthening material and influence thereof on the water-soluble organic binder.

Here, "modified silicone oil" refers to the oil in which another organic group has been added to a part of an alkyl group of dialkyl silicone oil or a part of the alkyl group has been replaced. In the present invention, the oil is used having a structure in which one or two or more types of the hydrophilic organic groups have been added to a part of the alkyl group of the silicone oil, or a part of the alkyl group has been replaced with one or two or more types of the hydrophilic organic groups.

The modified silicone oil in which the hydrophilic organic group for use in the present invention has been introduced preferably includes one or two or more types selected from a group consisting of: (poly)ether modified silicone oil having a structure in which an alkoxyl group such as $C_2H_4O-$, $C_3H_6O-$ is added to a part of the alkyl group of the silicone oil, or a part of the alkyl group is replaced with the alkoxyl group; amino modified silicone oil having a structure in which a part of the alkyl group of the silicone oil is replaced with an amino alkyl group; carboxyl modified silicone oil having a structure in which a part of the alkyl group of the silicone oil is replaced with a carboxyl group; and hydrophilic special modified silicone oil having a structure in which an alkoxyl group such as $C_2H_4O-$, $C_3H_6O-$ is added to a part of the alkyl group of the silicone oil, or a part of the alkyl group is replaced with the alkoxyl group, and further a part of the alkyl group of the silicone oil is replaced or added with at least one of an amino alkyl group, epoxy group, fatty acid ester, and sulfonic sodium.

It is to be noted that typical examples of the "alkyl group" constituting the silicone oil include a methyl group, and other examples are ethyl group, propyl group, isopropyl group, butyl group and the like.

In the present invention, among these modified silicone oils, at least one selected from a group consisting of the polyether modified silicone oil, and hydrophilic special modified silicone oil, or a mixture of them is especially preferable in that the dispersibility, and the insolubility in the water-soluble organic binder are especially superior.

In the present invention, with regard to the above-described modified silicone oil, in both the characteristics required for the above-described dispersion medium, a hydrophilic-lipophilic balance (HLB) is preferably in a range of 8 to 16, the hydrophilic-lipophilic balance (HLB) is more preferably in a range of 10 to 14, and the hydrophilic-lipophilic balance (HLB) is especially preferably in a range of 11 to 13.

Moreover, when the viscosity of the dispersion medium is large, that of the finally prepared partition wall strengthening agent also increases, and it is difficult to uniformly coat the partition wall strengthening agent to the partition wall. Therefore, an absolute viscosity of the dispersion medium itself is preferably 1 to 1000 mPa·s, more preferably 10 to 300 mPa·s.

The dispersion medium in the present invention may comprise the only amphipathic liquid compound which is a main component, and, for example, a binder, dispersant, defoamer, diluent or the like may be contained as other components.

Moreover, the partition wall strengthening agent in the present invention has an absolute viscosity of preferably 1 to 10000 mPa·s, more preferably 10 to 1000 mPa·s in order to efficiently coat the partition wall strengthening agent to the partition wall in a uniform thickness.

To coat the partition wall strengthening agent to the partition wall in the present invention, the honeycomb structure is immersed to a desired height from a cell opening end face in the partition wall strengthening agent. This is preferable in that the partition wall strengthening agent can be easily and uniformly coated to all the partition walls, and additionally a region in which the partition wall strengthened portion is to be disposed is easily optionally controlled. Additionally, to uniformly coat the partition wall strengthening agent, an excessively coated partition wall strengthening agent is preferably removed by compressed air or the like after the immersing. It is to be noted that the partition wall strengthening agent can be homogeneously applied even by spray coating, but it is difficult to optionally control the region in which the partition wall strengthened portion is to be disposed.

Next, in the present invention, as to the substrate of the honeycomb structure to which the partition wall strengthening agent has been coated, the firing of the substrate and the forming of the partition wall strengthened portion are simultaneously performed by one firing step.

In the present invention, the formed article to which the partition wall strengthening agent has been coated is preferably dried beforehand for the firing, and the examples of a drying method include blow drying, hot air drying, microwave drying and the like.

Moreover, as to conditions during the firing, desired conditions are preferably appropriately selected in accordance with types of the substrate and partition wall strengthening agent. For example, when the formed article is mainly composed of the cordierite-forming material, and the partition wall strengthening agent contains a melting point lowering component such as talc as the partition wall strengthening material, the substrate may be fired at 1300 to 1500° C.

The manufacturing method of the present invention has been described above for each step, and the manufacturing method of the present invention is capable of stably manufacturing a honeycomb structure superior in isostatic strength and resistance to erosion. Even in this high-precision manufacturing method, the honeycomb structure can be manufactured by one firing step, and high productivity and large product cost reduction can be achieved.

The present invention will be further concretely described hereinafter in accordance with examples, but the present invention is not limited to the examples. It is to be noted that the honeycomb structures obtained in examples and comparative examples were evaluated as follows.

(1) Average Value and Standard Deviation of Porosity in Partition Wall Strengthened Portion With regard to ten honeycomb structures obtained by each of the examples and comparative examples, the partition wall strengthened portion was cut out in a range of 70 cm² which substantially corresponded to a whole honeycomb structure end face to thereby obtain a sample for measurement. Next, the pore capacity of each sample was measured by a mercury porosimeter, the porosity of each whole partition wall strengthened portion was calculated assuming that true specific gravity of cordierite was 2.52 g/cc, and further an average value and standard deviation of the porosities of ten honeycomb structures obtained by each example and comparative example were obtained.

(2) Isostatic Strength

Opposite end portions of the honeycomb structure were covered with a metal plate having a diameter equal to that of the honeycomb structure, further an outer peripheral portion of the whole honeycomb structure was covered with a rubber tube having a diameter equal to that of the honeycomb structure, and the honeycomb structure was sealed in such a manner that water that was a pressure medium did not enter the structure.

Next, in this state, the honeycomb structure was submerged in water, a water pressure was raised until the honeycomb structure broke, and a water pressure value at which the structure broke was evaluated as an isostatic strength. It is to be noted that five honeycomb structures obtained by each example and comparative example were evaluated.

(3) Precipitation Start Time of Partition Wall Strengthening Material

After charging 200 cc of partition wall strengthening agent used in each example and comparative example into a graduated cylinder, the agent was left to stand, and a time when the partition wall strengthening material and the dispersion medium started separating (precipitation start of partition wall strengthening material) was visually observed and evaluated.

(4) Breaking Strength of Formed Article after Coating Partition Wall Strengthening Agent Immediately after the honeycomb formed article cut into a 12 mm×12 mm×12 mm block was immersed in the partition wall strengthening agent used in each example and comparative example for one minute, a load was applied to a plurality of partition walls from a right angled direction using a compression tester, and a breaking strength of the honeycomb formed article was evaluated. It is to be noted that the measurement was performed every five honeycomb formed articles cut into the blocks, and the average value was calculated.

EXAMPLE 1

To 100 parts by weight of a ceramic material formed of a cordierite-forming material, 8 parts by weight of methyl cellulose, 0.5 parts by weight of potassium laurate soap, 2 parts by weight of polyether, and 28 parts by weight of water were mixed, and charged into a continuous extrusion forming machine, and a honeycomb formed article was prepared.

Next, 15 mass % of $SiO_2$ was mixed with 85 mass % of a dispersion medium formed of polyether modified silicone oil (manufactured by Shin-Etsu Chemical Co., Ltd., trade name: KF618, HLB: 11, absolute viscosity: 20 mPa·s) to thereby prepare the partition wall strengthening agent, and the obtained formed article was immersed in a depth of 5 mm from a cell opening end face in an axial direction in the partition wall strengthening agent. The partition wall strengthening agent was coated to a partition wall existing in a cell opening end portion of the formed article. Immediately after this, compressed air was supplied at room temperature, and excessively coated partition wall strengthening agent was removed.

Next, a substrate of a honeycomb structure in which the partition wall strengthening agent was coated to the partition wall existing in the cell opening end portion was fired at 1400° C. for four hours, and a columnar honeycomb structure (fired article) was manufactured having a partition wall thickness of 50 μm, diameter of 100 mm, height of 100 mm, square cells at a density of 140 cells/cm², and numerical aperture of 88%.

EXAMPLE 2

A honeycomb structure was manufactured in the same manner as in Example 1 except that polyether modified silicone oil (manufactured by Shin-Etsu Chemical Co., Ltd., trade name: KF355A, HLB: 12, absolute viscosity: 140 mPa·s) having different absolute viscosity was used as a dispersion medium of a partition wall strengthening agent.

COMPARATIVE EXAMPLE 1

A honeycomb structure was manufactured in the same manner as in Example 1 except that water was used as a dispersion medium of a partition wall strengthening agent, and 0.5 part by mass of alkyl acetal polyvinyl alcohol (manufactured by Sekisui Chemical Co., Ltd., trade name: Erek KW-3) was added as a dispersant to 100 parts by mass of dispersion medium.

COMPARATIVE EXAMPLE 2

A honeycomb structure was manufactured in the same manner as in Example 1 except that kerosene was used as a dispersion medium of a partition wall strengthening agent, and 0.5 part by mass of polyoxyalkylene group polymer (manufactured by NOF Corp., trade name: Mariarim AKM-0531) was added as a dispersant to 100 parts by mass of dispersion medium.

Evaluation

In any of the manufacturing methods of the respective examples and comparative examples, an average porosity was 20.9 to 21.2% in partition wall strengthened portions of obtained honeycomb structures, and the porosity dropped by about 7% as compared with a porosity of 28% in a general portion.

Additionally, in the manufacturing method of Comparative Example 1 in which silica ($SiO_2$) powder dispersed in water was used as a partition wall strengthening agent, remarkable deformation was recognized to a visually clearly confirmable degree in the partition wall of the obtained honeycomb structure. A breaking strength of a formed article before firing was 0.5 kg/cm² or less, an isostatic strength of the honeycomb structure (fired article) after firing was 5 kg/cm² or less, and either strength was remarkably small. A precipitation start time of silica ($SiO_2$) powder dispersed in water was about 25 minutes, and short. A standard deviation of an average porosity in partition wall strengthened portions was 0.84%, and fluctuation was large among ten honeycomb structures.

Moreover, in the manufacturing method of Comparative Example 2 in which silica ($SiO_2$) powder dispersed in kerosene was used as a partition wall strengthening agent, any deformation of a partition wall was not recognized, and a strength that did not cause any problem in practical use was obtained as to the isostatic strength of the honeycomb structure (fired article). Additionally, the precipitation start time of silica ($SiO_2$) powder dispersed in kerosene was one minute or less, and very short. The standard deviation of the average porosity in the partition wall strengthened portions was 1.46%, and the fluctuation was very large among ten honeycomb structures (fired articles).

On the other hand, in the manufacturing methods of Examples 1, 2 in which silica ($SiO_2$) powder dispersed in polyether modified silicone oil was used as the partition wall strengthening agent, there was not any deformation of the partition wall. The breaking strength of the formed article to which the partition wall strengthening agent was coated was 7 $kg/cm^2$ or more, the isostatic strength of the honeycomb structure (fired article) after firing was 22 $kg/cm^2$ or more, and any problem was not caused in practical use. The precipitation start time of silica ($SiO_2$) powder dispersed in polyether modified silicone oil was about 55 minutes, and very long. The standard deviation of the porosities in the partition wall strengthened portions was 0.42% or less, and the fluctuation was remarkably small among the honeycomb structures (fired articles). The partition wall strengthening agents and evaluation results used in the respective examples and comparative examples are shown in Table 1.

TABLE 1

| | Main composition of partition wall strengthening agent | Porosity of partition wall strengthened portion (%) n = 100 | | | | Average value of isostatic strength (kg/cm$^2$) n = 5 | Precipitation start time of partition wall strengthening material | Average value of breaking strength of formed article (kg/cm$^2$) n = 5 |
|---|---|---|---|---|---|---|---|---|
| | | Average value | Maximum value | Minimum value | Standard deviation | | | |
| Example 1 | KF618*[1]/SiO$_2$ (15%) | 20.9 | 21.4 | 20.5 | 0.33 | 23.5 | About 55 minutes | 7.0 |
| Example 2 | KF355A*[2]/SiO$_2$ (15%) | 20.9 | 21.7 | 20.4 | 0.42 | 22.2 | About 60 minutes | 7.5 |
| Comparative Example 1 | Water*[3]/SiO$_2$ (15%) | 20.9 | 22.0 | 19.9 | 0.84 | 5.0 or less | About 25 minutes | 0.5 or less |
| Comparative Example 2 | Kerosene*[4]/SiO$_2$ (15%) | 21.2 | 23.5 | 19.2 | 1.46 | 22.9 | 1 minute or less | 7.0 |

*[1]KF618 is polyether modified silicone oil (manufactured by Shin-Etsu Shemical Co., Ltd.)/HLB11.
*[2]KF355A is polyether modified silicone oil (manufactured by Shin-Etsu Chemical Co., Ltd.)/HLB12.
*[3]Alkyl acetalizing polyvinyl alcohol (manufactured by Sekisui Chemical Co., Ltd., Esrek KW-3) is contained by 0.5 parts by mass with respect to 100 parts by mass of water.
*[4]Polyalkylene group polymer (manufactured by NOF Corp., Mariarim AKM-0531) is contained as a dispersant by 0.5 parts by mass with respect to 100 parts by mass of kerosene.

INDUSTRIAL APPLICABILITY

As described above, according to a manufacturing method of the present invention, while largely improving enhancement of productivity and product cost reduction, a honeycomb structure superior in isostatic strength and resistance to erosion can be stably obtained.

The invention claimed is:

1. A method for manufacturing a honeycomb structure, comprising the steps of: preparing a honeycomb formed article comprising a plurality of partition walls using clay mainly composed of a ceramic material; coating a partition wall strengthening agent to a plurality of partition walls existing in at least one cell opening end portion of the formed article; and thereafter firing the article,
   wherein a dispersion liquid containing a partition wall strengthening material mixed in a dispersion medium containing an amphipathic liquid compound having both hydrophilic and hydrophobic groups, the amphipathic liquid component being a main component used as the partition wall strengthening agent; the ceramic material includes cordierite, and the partition wall strengthening material includes a cordierite melting point lowering material comprising at least one type selected from a group consisting of silica, magnesia, talc, and kaolin, or a mixture thereof.

2. The method for manufacturing the honeycomb structure according to claim 1, wherein the amphipathic liquid compound is a nonionic amphipathic liquid compound.

3. The method for manufacturing the honeycomb structure according to claim 1, wherein the amphipathic liquid compound is modified silicone oil with a hydrophilic organic group introduced.

4. The method for manufacturing the honeycomb structure according to claim 2, wherein the amphipathic liquid compound is modified silicone oil with a hydrophilic organic group introduced.

5. The method for manufacturing the honeycomb structure according to claim 3, wherein the modified silicone oil is at least one type selected from a group consisting of polyether modified silicone oil and hydrophilic modified silicone oil, or a mixture thereof.

6. The method for manufacturing the honeycomb structure according to claim 4, wherein the modified silicone oil is at least one type selected from a group consisting of polyether modified silicone oil and hydrophilic modified silicone oil, or a mixture thereof.

7. The method for manufacturing the honeycomb structure according to claim 1, wherein the clay mainly composed of the ceramic material contains a water-soluble organic binder.

* * * * *